United States Patent [19]

Hanft

[11] 3,718,049
[45] Feb. 27, 1973

[54] AUTOMATIC PROGRAM GENERATOR AND SIGNALLER SYSTEM

[75] Inventor: Charles Hanft, Hicksville, N.Y.

[73] Assignee: The F. and M. Schaefer Brewing Co., Brooklyn, N.Y.

[22] Filed: May 14, 1971

[21] Appl. No.: 143,438

[52] U.S. Cl. ...................74/89, 74/567, 33/174
[51] Int. Cl. .....................................F16h 27/02
[58] Field of Search ......74/89, 567, 568, 57; 33/147, 33/174

[56] References Cited

UNITED STATES PATENTS

| | | | |
|---|---|---|---|
| 2,621,495 | 12/1952 | Garbarini | 74/568 |
| 3,160,744 | 12/1964 | Weiss | 74/567 |
| 2,788,677 | 5/1957 | Hayek | 74/567 |
| 3,105,215 | 9/1963 | Seibold, Sr. | 74/567 |
| 3,248,064 | 4/1966 | Rollings | 74/57 |
| 3,353,761 | 11/1967 | Graf | 74/57 |
| 2,610,805 | 9/1952 | Schweiter | 33/174 P |
| 2,789,354 | 4/1957 | Polidor et al. | 33/174 P |
| 2,372,427 | 3/1945 | Johnson | 33/174 P |
| 2,897,464 | 7/1959 | Miller | 340/195 |

Primary Examiner—Charles J. Myhre
Assistant Examiner—Wesley S. Ratliff, Jr.
Attorney—Wenderoth, Lind & Ponack

[57] ABSTRACT

A program cam assembly is mounted on a base. Mounted above the program cam assembly for longitudinal movement thereover is a carrier assembly carrying a cam follower assembly. The cam follower assembly has a cam follower which traverses a program surface of a program cam, thereby imparting vertical movement to the cam follower assembly. This vertical movement produces at least two separate program signals, The cam follower assembly is automatically operated to sequentially index a plurality of program cams beneath the cam follower.

11 Claims, 8 Drawing Figures

FIG.1

INVENTOR
CHARLES HANFT

INVENTOR
CHARLES HANFT

BY Wenderoth, Lind & Ponack
ATTORNEYS

AUTOMATIC PROGRAM GENERATOR AND SIGNALLER SYSTEM

BACKGROUND OF THE INVENTION

1. Field of the Invention

The present invention relates to a novel automatic program generator and signaller system of the type wherein a cam follower is moved over a program cam and wherein the mechanical movement resultant therefrom is adapted to be converted into an analogue signal.

More specifically, the present invention relates to such a novel system which enables the mechanical movement of the cam follower to produce two or more independent analogue signals.

Even further specifically, the present invention relates to such a novel system wherein more than one program cam may be automatically moved into position beneath the cam follower to produce on extended program without interruption thereof.

2. Description of the Prior Art

It is quite common practice in many fields to produce an analogue signal by conversion of the mechanical movement of a cam follower upon traversing the path of a program cam. One use for such a system is in the automatic controlling of various processing operations. In such uses, a program cam adapted to produce a desired control signal is positioned in a process control bank. A cam follower traverses the program cam and the movement thereof is converted into an analogue signal, for instance an electrical, pneumatic, hydraulic or further mechanical signal.

However, all such prior art systems have certain inherent disadvantages. In a complex processing system, it is often desirable to produce more than one program signal. For instance, it may be desirable to produce an electrical signal and a pneumatic signal, both derived from the same program, but used for different purposes in the same processing system. Past attempts to produce a program signaller capable of separate signals based upon the same program have been very expensive and have performed less than satisfactorily.

Additionally, it many processing control systems, it is necessary to have an extremely lengthy program. For instance, in many processing operations, the entire operation may take many hours. In the past there has not been provided a program generator and signaller system which is capable of providing such an extended program without necessitating the use of an unacceptable amount of space.

OBJECTS AND BRIEF DESCRIPTION OF THE INVENTION

With the above disadvantages in mind, it is a primary object of the present invention to provide an automatic program generator and signaller system capable of producing separate signals based on the same program.

It is a further object of the present invention to provide such a system including means for automatically presenting a plurality of program cams to the cam follower, thereby producing a lengthy and continuous program, without interruption thereof.

It is an even further object of the present invention to provide such a system which is compact and accordingly may be employed in process control banks wherein space is at a premium.

It is a still further object of the present invention to provide such a system which is simple of construction and inexpensive to manufacture.

These objects are achieved in accordance with the present invention by positioning a program cam assembly on a base. A carriage assembly is mounted above the program cam assembly for movement in the longitudinal direction thereof. The carriage assembly carries a cam follower assembly which is mounted for vertical sliding movement with respect to the carriage assembly. As the carriage assembly is moved in the longitudinal direction of the program cam assembly, the cam follower assembly moves therewith. However, the cam follower assembly moves vertically with respect to the carriage assembly as the cam follower traverses the surface of the program cam.

A lever is mounted for pivotal movement and is adapted to be pivoted by vertical movement of the cam follower assembly. A first analogue signal is produced by the vertical movement of the cam follower assembly itself. One or more additional analogue signals may be produced by the pivotal movement of the lever in response to the vertical movement of the cam follower assembly.

As the cam follower assembly completes its traversal of a first program cam, this completion is automatically detected. At such detection, a second program cam is automatically positioned below the cam follower to replace the first program cam. A bridge is provided between the finishing end of the first program cam and the beginning end of the second program cam to enable the cam follower to be transferred without interruption of the program. The program cam assembly may include more than two program cams. Other objects and features of the present invention will be made clear from the following detailed description together with the accompanying drawings.

DETAILED DESCRIPTION OF THE INVENTION

Figure 1:
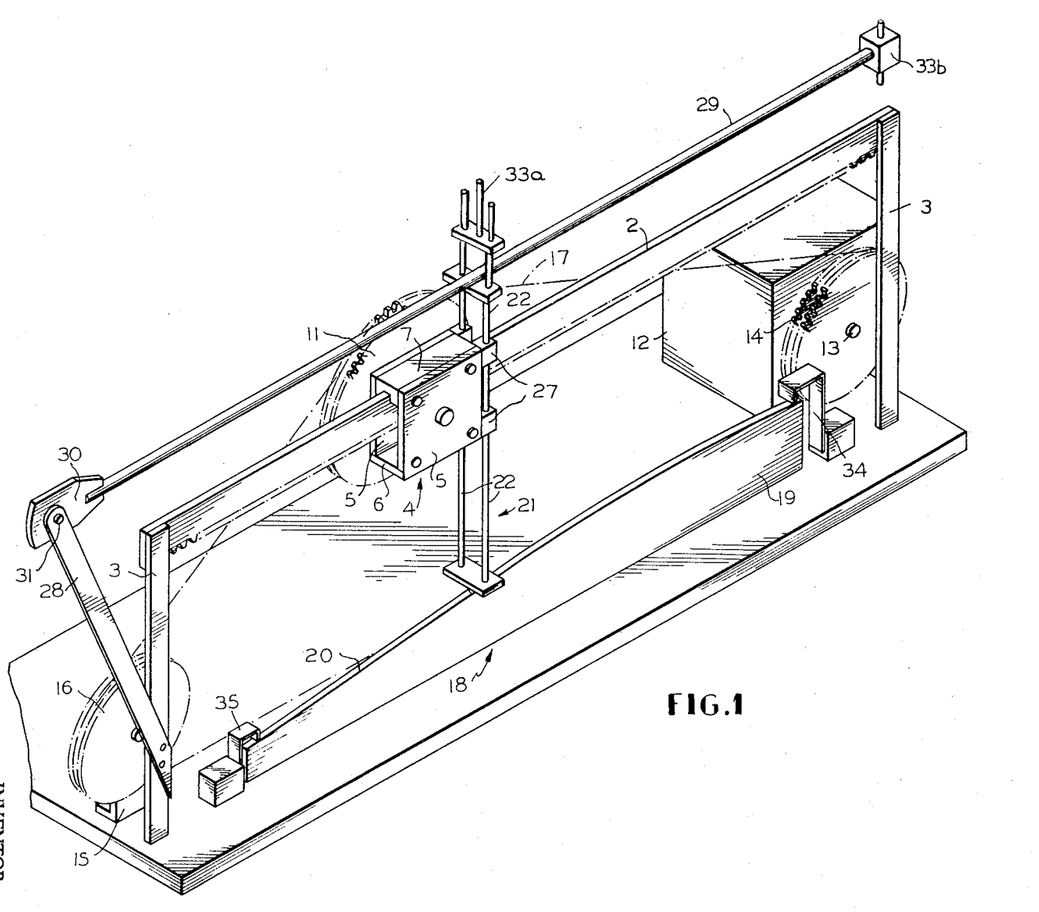
FIG. 1 is a perspective view of the overall system of the present invention, but illustrating only a single program cam.
Figure 2:
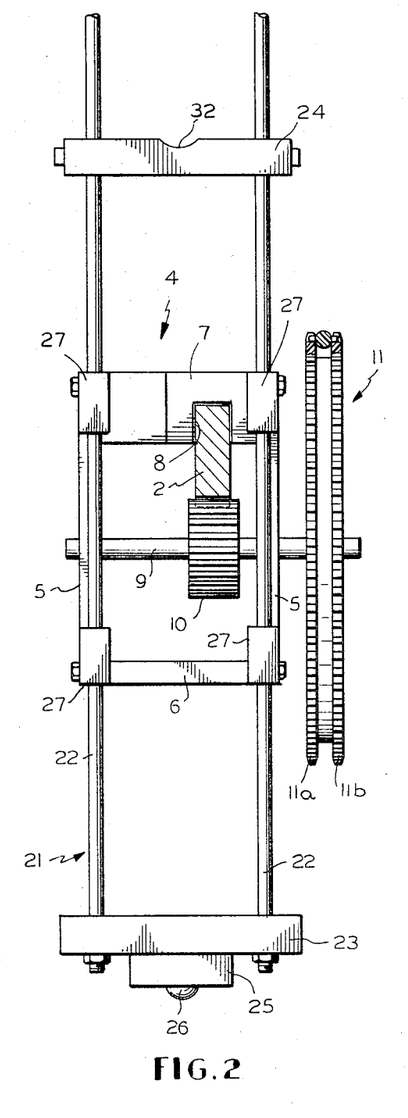
FIG. 2 is a view partially in cross-section of the carriage assembly and cam follower assembly illustrated in FIG. 1 as viewed from the right side thereof.

With reference now to FIGS. 1 and 2 of the drawings, the overall program generator and signaller system of the present invention will be described in detail.

Above the surface of a suitable base 1 is horizontally mounted a rack 2. In the illustrated embodiment rack 2 is supported by a pair of vertical columns 3. However, it is to be understood that many other means of mounting the rack would be apparent to those skilled in the art. Mounted for movement along rack 2 is a carriage assembly 4. In the illustrated embodiment, the carriage assembly 4 includes a pair of side plates 5 separated by a bottom plate 6 and a top plate 7. As shown in FIG. 2, the top plate 7 may be formed with a groove 8 therein to provide a guide for movement of the carriage assembly along the rack 2. Preferably, the plate 7 is made of a material having a low coefficient of friction, such as Teflon. Conveniently, top plate 7 may be formed from three laminations of material, such as shown in FIG. 2, to provide ease in formation of groove 8. A shaft 9 is journalled for rotation in side plates 5. Solidly mounted on shaft 9 between side plates 5 is a gear 10 adapted to mesh with the teeth of rack 2. On one end of shaft 9, exteriorly of one of the side plates 5, is solidly mounted a gear means 11. In the illustrated embodiment, gear means 11 consists of a double gear having gears 11a and 11b joined together.

Also mounted on base 1 is a suitable drive means 12 having a shaft 13 extending therefrom. Mounted rigidly on shaft 13 to be in alignment with gear means 11 is a drive gear 14. Also mounted on base 1 by means of a suitable support 15 to be in alignment with gear means 11 and drive gear 14 is an idler gear 16. Drive means 12 is conventional in the art and includes the capability of varying the speed and direction of rotation of shaft 13, and thus drive gear 14.

Positioned around gear means 11, drive gear 14 and idler gear 16 is a suitable drive belt 17. In the illustrated embodiment, drive belt 17 consists of a flexible belt having drive pins protruding outwardly from each side thereof. The flexible belt is adapted to be run between the double gears of gear means 11, drive gear 14 and idler gear 16 such that the drive pins engage with the teeth of each of the double gears. However, it is to be understood that the scope of the present invention contemplates the use of other conventional drive systems. For instance, gear means 11, drive gear 14 and idler gear 16 could be pulleys, and drive belt 17 could be a suitably designed flat belt or V belt. Also, gear means 11, drive gear 14 and idler gear 16 could be single gears adapted to be driven by a link chain. It is furthermore to be understood that it might be desirable to provide a double drive system, that is, with a part thereof on either side of carriage assembly 4. Such alteration would of course require a second gear means mounted on the other end of shaft 9, a second drive gear mounted on an extension of shaft 13, a second idler gear 16, and a second drive belt 17.

Mounted on base 1 below rack 2 is a program cam assembly 18. For purposes of clarity in FIG. 1, program cam assembly 18 consists of a single program cam 19. The cam surface 20 of program cam 19 is shaped to produce a desired program.

Attached to carriage assembly 4 to move in a horizontal direction therewith is a cam follower assembly 21. Cam follower assembly 21 includes a pair of bars 22 spaced apart by lower and upper plates 23 and 24. Suitably attached to lower plate 23, for instance by means of bearing mounting 25, is a cam follower 26, which contacts the program surface 20 of program cam 19. In the illustrated embodiment cam follower 26 is in the form of a ball bearing, for a purpose which will become apparent below. However, it is to be understood that any conventional cam follower device might be employed in place of the ball bearing.

In the illustrated embodiment, bars 22 of cam follower assembly 21 are slidingly mounted within passages of brackets 27, which are attached to the carriage assembly. Thus, it will be seen that as carriage assembly 4 is moved to the right in FIG. 1, cam follower assembly 21 will be moved therewith. However, it will also be apparent that depending upon the contour of surface 20 of program cam 19, the cam follower assembly will also be moved in a vertical direction with respect to the carriage assembly due to contact of cam follower 26 with cam surface 20.

A suitable bracket 28 is attached to one of the columns 3 to provide a pivot support for signal lever 29. In the illustrated embodiment, lever 29 is rigidly secured in a grip 30. Grip 30 is mounted to freely pivot around a horizontal shaft 31 which is attached to bracket 28. Lever 29 is positioned between bars 22 and rests on upper plate 24 of cam follower assembly 21. If desired, upper plate 24 may have a recess 32 therein to aid in positioning lever 29. It is to be understood, and it will be apparent to those skilled in the art, that the means for mounting the lever 29 for pivotal movement might be other than that specifically illustrated.

It will be readily apparent that, as cam follower assembly 21 is raised and lowered due to movement of cam follower 26 over cam surface 20, signal lever 29 is pivoted around shaft 31 due to the contact of lever 29 with the upper plate 24 of the cam follower assembly 21.

A first signal takeout 33a is attached to the upper portion of bars 22 of cam follower 21. First takeout 33a may be operatively connected with any conventional signal device, such as a mechanical, electrical, pneumatic, or hydraulic signal device. The movement of takeout 33a in response to movement of the cam follower 26 will thus provide a first program signal. A second signal takeout 33b may be suitably attached adjacent the end of lever 29 opposite from pivot shaft 31. Takeout 33b might also be operatively connected to a conventional mechanical, electrical, pneumatic or hydraulic signal device. The movement of takeout 33b, in response to movement of cam follower assembly 21 and lever 29, produces a second program signal. This second signal is of course proportional to the first program signal. It is to be understood that, if desired, additional signal takeouts could be located on lever 29.

Mounted adjacent the finishing or righthand (as viewed in FIG. 1) end of program cam 19 is a first position detection means, such as microswitch 34 adapted to be actuated by lower plate 23 upon arrival of cam follower assembly 21 at such position. When microswitch 34 is actuated, drive means 12 may be stopped or the direction thereof may be reversed, and the reverse speed thereof might be increased or decreased, as will become apparent below. Additionally, a second position detection means, such as microswitch 35 is mounted at the opposite end of program cam 19 and is also adapted to be actuated by lower plate 23 of cam follower assembly 21. The actuation of microswitch 35 might also be used to actuate drive means 12 is discussed above with regard to microswitch 34. Additionally, the actuation of microswitches 34 and 35 may be used for the automatic repositioning of program cam assembly 18, as will be described in more detail below. It is to be understood that the position detection means could include other conventional devices such as photoelectric cells.

It is to be further understood that regarding the above discussion and the following discussion, the circuitry for connecting drive means 12, microswitches 34 and 35, and the program cam assembly is conventional and would be readily known to those skilled in the art. Accordingly, and for purposes of clarity, such circuitry is not herein described in detail.

Figures 3, 4:
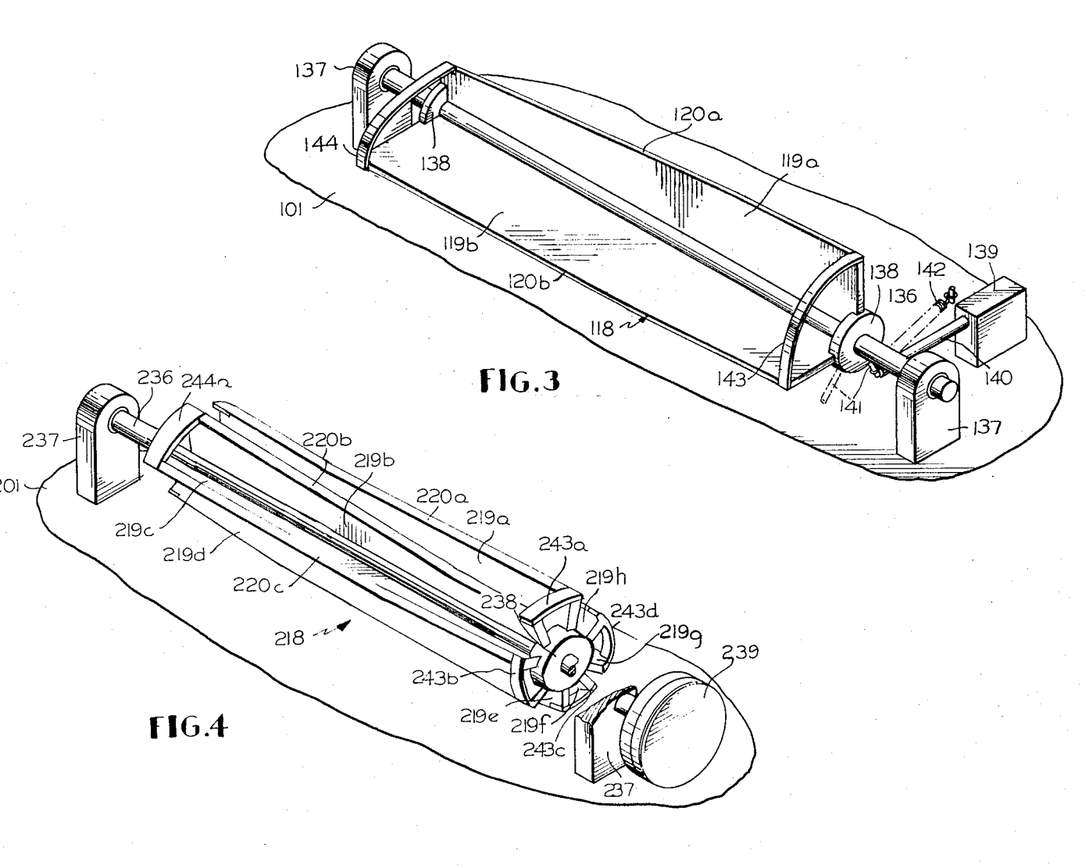
FIG. 3 is a perspective view of a first embodiment of a program cam assembly for use in the system illustrated in FIG. 1.
FIG. 4 is a perspective view of a second embodiment of a program cam assembly for use in the system illustrated in FIG. 1.

With reference now to FIG. 3 of the drawings, a first embodiment of a program cam assembly for use in the system of FIG. 1 will be described in detail.

A shaft 136 is mounted above base 101 by bearing brackets 137 for free rotation therein. A pair of program cams 119a and 119b are positioned radially on shaft 136 and are held rigidly in place by any suitable means such as slotted collars 138.

When program cam assembly 118 is used in the system illustrated in FIG. 1, the program cam 119a will be positioned as shown, that is, presenting its cam surface 120a to the cam follower 26 of cam follower assembly 21. Initially, the cam follower will be on the lefthand end of cam surface 120a as viewed in FIG. 3. As drive means 12 is started, carriage assembly 4 and cam follower assembly 21 will be moved toward the right end of cam surface 120a. When cam follower assembly 21 reaches the far righthand end of cam surface 120a microswitch 34 will be actuated as described above. In addition to reversing the direction of drive means 12 as discussed above, the actuation of microswitch 34 will actuate solenoid 139. An arm 140 of solenoid 139 will thus act upon an arm 141 extending from one collar 138. Arms 140 and 141 will thus take the position illustrated by the broken lines in FIG. 3. Collars 138, shaft 136 and cams 119a and 119b will thus be rotated to move cam 119b into the position previously occupied by cam 119a. This rotation is made against the bias provided by a spring 142 suitably mounted to normally urge arm 141 against arm 140.

A bridge 143 is provided between the finishing end of cam 119a and the beginning end of cam 119b. Thus, as the cams are rotated by the action of solenoid 139, cam follower 26 will be in contact with bridge 143 to insure continuity of operation. Normally, the movement of solenoid 139 is sufficiently fast with respect to the movement of the cam follower assembly, that there need be no delay in the movement of drive means from one direction to the reverse direction. That is, the transfer of the cams is essentially instantaneous when considering the movement of the cam follower assembly.

After the transfer of the cams as above described, and since the direction of the drive means 12 has been reversed, the cam follower 26 will begin traversal of the cam surface 120b from the right to the left as viewed in FIG. 3. It is to be noted that the righthand ends of cams 119a and 119b are the same height to insure that the signal at the end of cam 119a is the same as the signal at the beginning of cam 119b. If desired a bridge 144 may be provided between the end of cam 119b and the beginning of cam 119a. This would operate to facilitate the beginning of a new program sequence. However, it is to be understood that bridge 144 need not be supplied, and that the beginning of a new program cycle might be manipulated manually. However, it is to be further understood that if bridge 144 is to be used to automatically initiate the start of a new program cycle, microswitch 35 must be connected to deenergize solenoid 139 to retract arm 140 and to thereby allow spring 142 to return the cams to their initial position.

With reference now to 4 of the drawings, a second embodiment of a program cam assembly for use in the system of FIG. 1 will be described in detail. The program cam assembly 218 illustrated in FIG. 4 is similar to the program cam assembly 118 illustrated in FIG. 3. However, whereas assembly 118 has only two program cams cams, that is 119a and 119b, assembly 218 has any desired number of program cams more than two. In the embodiment illustrated in FIG. 4, assembly 218 employs eight program cams, 219a–219h. These program cams are positioned radially on a shaft 236 and are held rigidly in place by suitable means such as slotted collars 238. Shaft 236 is mounted above base 201 by bearing brackets 237 for free rotation therein. The above mounting is similar to the mounting of assembly 118 shown in FIG. 3.

When program cam assembly 218 is used on the system illustrated in FIG. 1, program cam 219a will be positioned as shown, that is with its cam surface 220a in contact with the cam follower 26 of cam follower assembly 21. Movement of the cam follower is from the left to the right of cam surface 220a as viewed in FIG. 4. When cam follower assembly 21 reaches the far righthand end of cam surface 220a, microswitch 34 will be actuated to reverse the direction of drive means 12 as discussed above. However, the actuation of microswitch 34 will also actuate rotary solenoid 239 to index the program cam assembly 218 such that program cam 219b is moved into the position previously occupied by program cam 219a. Any conventional rotary solenoid may be incorporated in this assembly. Bridge 243a is provided between the finishing end of cam 219a and the beginning end of cam 219b, to insure continuity of operation.

Since drive means 12 is now rotating in the reverse direction, cam follower 26 traverses cam surface 220b of cam 219b toward the lefthand end thereof as viewed in FIG. 4. When cam follower assembly 21 reaches the lefthand end of cam 219b, microswitch 35 is actuated. The actuation of microswitch 35 once again reverses the direction of drive means 12 and also once again actuates rotary solenoid 239 to index program cam assembly 218 such that program cam 219c presents its cam surface 220c to cam follower 26 of cam follower assembly 21. A bridge 244a is provided between the finishing end of cam 219b and the beginning end of cam 219c to insure continuity of operation. The finishing end of each program cam is of the same radial height as the beginning end of the succeeding program cam.

It will be apparent from the above discussion that the operation of the system of FIG. 1 employing the program cam assembly 218 shown in FIG. 4 will be continuous throughout the traversing of the eight program cams illustrated. The direction of drive means 12 will be continually reversed, and rotary solenoid 239 will be actuated to index assembly 218, such that the cam follower 21 will in turn traverse the cam surfaces of each of the program cams 219a-219h. It is of course to be understood that the assembly 218 may be designed to automatically reinitiate a new program cycle, or the assembly may be designed to stop after the cam surface of cam 219h is traversed. It will also be apparent that other known conventional indexing devices other than rotary solenoid 239 might be employed.

Figure 5:
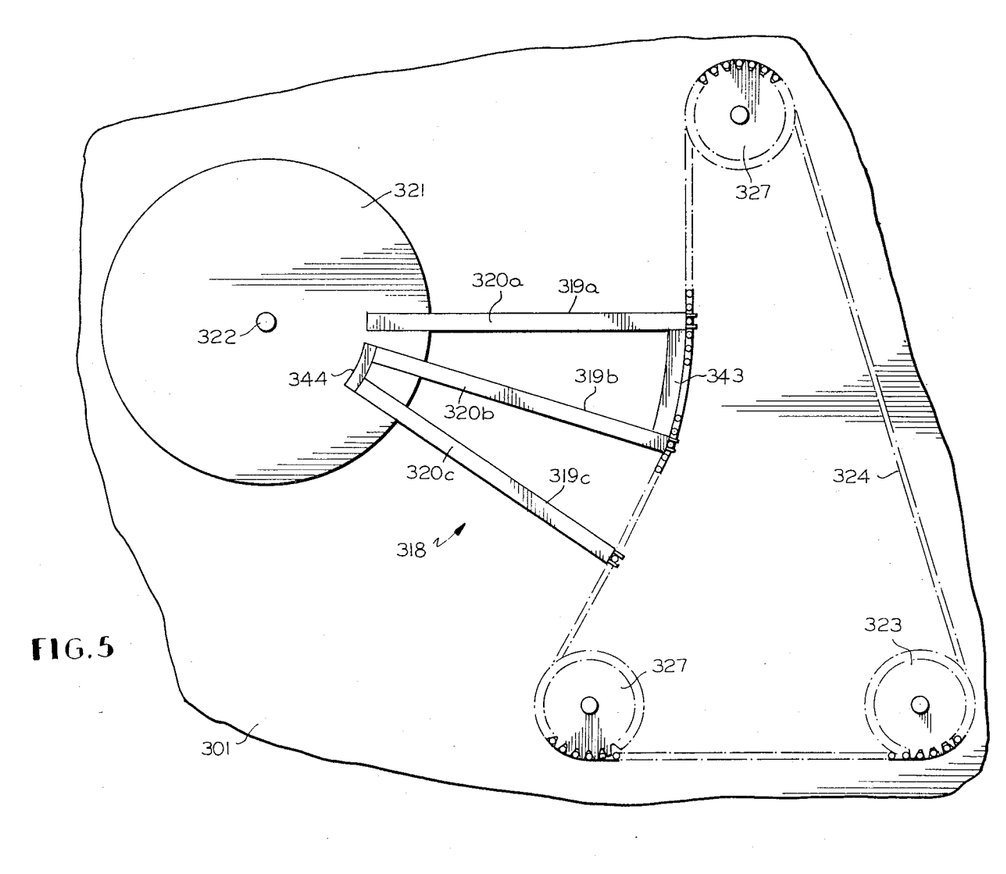
FIG. 5 is a plan view of a third embodiment of a program cam assembly for use in the system illustrated in FIG. 1.
Figure 6:
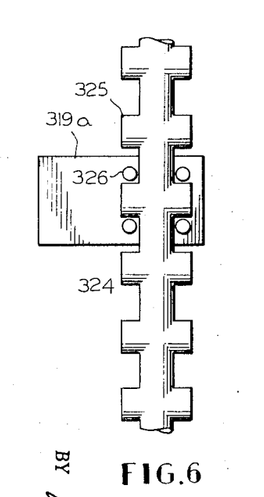
FIG. 6 is an enlarged end view of the righthand end of a program cam illustrated in FIG. 5.

With reference now to FIGS. 5 and 6 of the drawings, a third embodiment of a program cam assembly for use in the system of FIG. 1 will be described in detail.

A disc 321 is mounted by means of shaft 322 to rotate in a horizontal plane above base 301. On the upper surface of disc 321 are rigidly mounted a desired plurality of program cams. In FIG. 5 are shown three such program cams 319a-319c. It is of course to be understood that any desired number more than three program cams might be so mounted. Each of the program cams is positioned by suitable means such as pins on to the upper surface of disc 321 such that the longitudinal axis of each cam extends through the axis of shaft 322, but such that the end of each cam nearest shaft 322 is radially spaced from shaft 322.

When the assembly 318 is used in the system of FIG. 1, cam follower 26 is traversed from the left to the right of cam surface 320a of program cam 319a as reviewed in FIG. 5. When cam follower 26 and cam follower assembly 21 reach the far righthand end of cam surface 320a, microswitch 34 is actuated. The actuation of microswitch 34 reverses the direction of drive means 12 as discussed above, and additionally actuates a drive means (not shown) to cause drive gear 323 to rotate clockwise as shown in FIG. 5. This causes belt 324 to index disc 321 and cams 319a-319c around shaft 322 in the counterclockwise direction as illustrated in FIG. 5, such that cam 319b is moved to the position previously occupied by program cam 319a.

As shown in FIG. 6, belt 324 may conveniently comprise a flexible molded belt having projections 325 extending therefrom. Projections 325 are adapted to engage with pins 326 extending outwardly from the righthand ends as viewed in FIG. 5 of the program cams. Thus, when belt 324 is caused to rotate by drive gear 323 around idler gears 327, projections 325 engage pins 326. This causes cams 319a-319c and disc 321 to rotate counterclockwise around shaft 322. This rotation is designed of course to continue only long enough to properly index the new program cam below cam follower 26. Bridge 343 is provided between the finishing end of cam 319a and the beginning end of cam 319b to insure continuity of operation.

When program cam 319b is properly indexed, and since drive means 12 is operating in the reverse direction, cam follower 26 will traverse cam surface 320b from the right to the left as viewed in FIG. 5. When cam 326 reaches the far lefthand end of cam surface 320b, cam follower assembly 21 will actuate microswitch 35 as discussed above. This actuation will once again reverse the direction of drive means 12 and will cause a further indexing of the program cams such that cam surface 320c of program cam 319c is positioned below cam follower 26. To insure continuity of operations during this indexing operation, bridge 344 is provided between the finishing end of cam 319b and the beginning end of cam 319c. The finishing end of each program cam is of the same height as the beginning end of the succeeding program cam.

It is to be understood that any conventional indexing means can be used as the driving means to operate drive gear 323. For instance, rotary solenoid could be conveniently employed for this purpose. It is to be further understood that disc 321 could be solidly mounted on shaft 322 and shaft 322 could be journalled in suitable bearings. If such arrangement were made, it will be apparent that a rotary solenoid could be mounted on shaft 322 to index the same upon suitable signals from microswitches 34 and 35. If such arrangement were made, it would not be necessary to provide gears 323 and 327, belt 324 and pins 326. It is to be even further understood that the shape of element 321 is shown as a disc for illustrative purposes only. In other words, element 321 need not be in the form of a disc. It is only necessary that element 321 provide sufficient surface for mounting the ends of the program cams thereon. For instance, it will be apparent that element 321 illustrated in FIG. 5 could very well be provided in a pie-shape.

Figure 7:
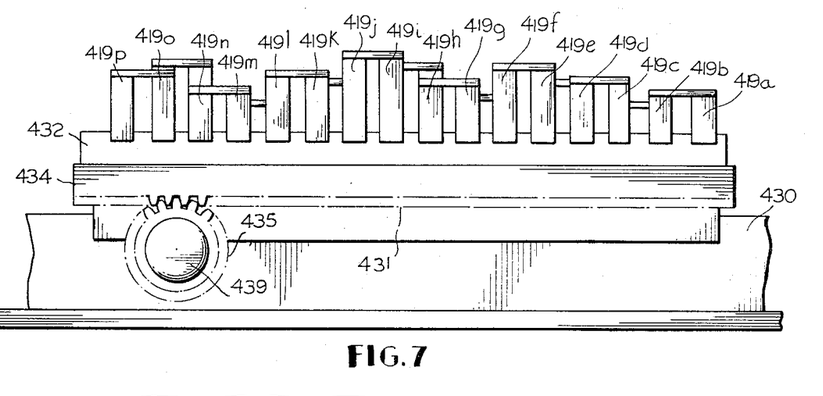
FIG. 7 is a side view of a fourth embodiment of a program cam assembly for use in the system illustrated in FIG. 1.
Figure 8:
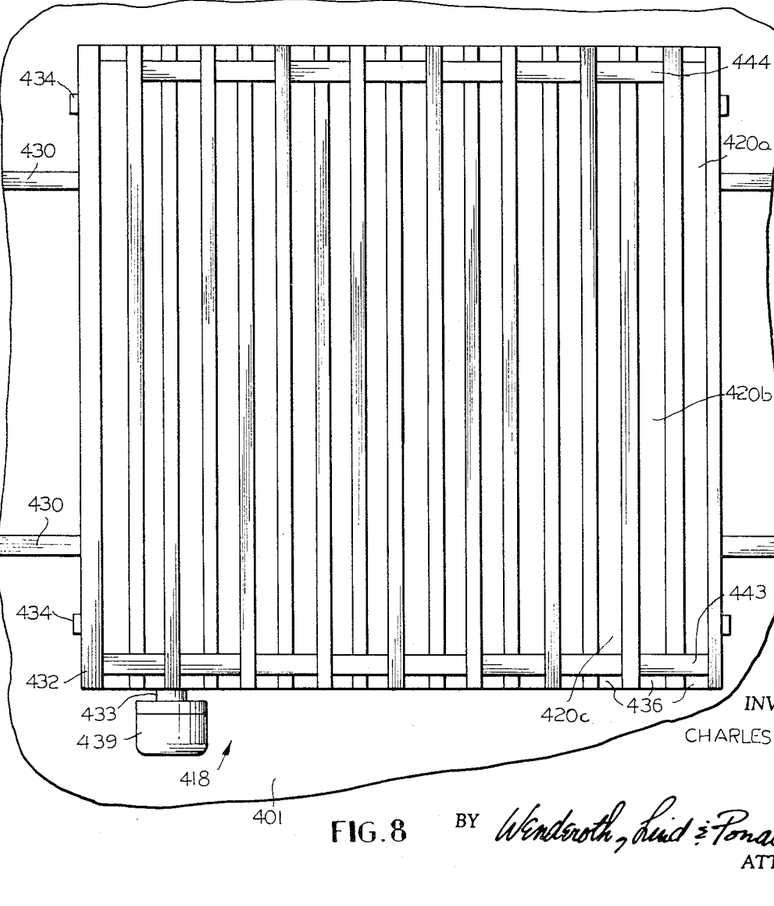
FIG. 8 is a plan view of the program cam assembly illustrated in FIG. 7.

With reference now to FIGS. 7 and 8 of the drawings, a fourth embodiment of a program cam assembly for use in the system of FIG. 1 will be described in detail. On a base 401 are provided parallel tracks 430. Mating tracks 431 fastened to a support table 432 engage with tracks 430 for movement therealong. A shaft 433 is journalled through tracks 430. Also fastened to the bottom surface of support table 432 are one or more racks 434. A gear 435 rigidly secured to shaft 433 is positioned to mesh with each rack 434. Held in place in grooves 436 in the upper surface of support table 432 are a suitable number of program cams. In FIGS. 7 and 8, sixteen such program cams 419a-419p are illustrated. It is of course to be understood that the number of program cams provided might be any number necessary to complete the desired program.

When program cam assembly 418 is used in the system illustrated in FIG. 1, cam follower 26 will begin traversal of cam surface 420a of cam 419a from the top to the bottom as viewed in FIG. 8. When cam follower 26 reaches the lower end as viewed in FIG. 8 of program surface 420a, cam follower assembly 21 will actuate microswitch 34, thereby reversing direction of drive means 12. Simultaneously, the actuation of microswitch 34 will actuate a rotary solenoid 439, mounted on shaft 433. Actuation of rotary solenoid 439 will cause shaft 433 and gears 435 to rotate in a clockwise direction as viewed in FIG. 7, thereby causing racks 434 and support table 432 to move toward the right. This movement will index the program cams such that cam 419b is moved to the position previously occupied by cam 419a. A bridge 443 is provided between the finishing end of cam 419a and the beginning end of cam 419b to insure continuity of operation.

Since drive means 12 is now operating in the reverse direction, cam follower 26 will now traverse cam surface 420b from the bottom to the top as viewed in FIG. 8. When cam follower 26 reaches the end of cam surface 420b, cam follower assembly 21 will actuate microswitch 35 to once again reverse direction of drive means 12 as discussed above. The actuation of microswitch 35 will also operate to cause rotary solenoid 439 to further index assembly 418 such that cam surface 420c of program cam 419c is positioned below cam follower 26. A bridge 444 is provided between the finishing end of cam 419b and the beginning end of cam 419c to insure continuity of operation. The finishing end of each program cam is of the same height as the beginning end of the succeeding program.

It will be apparent that the above reversal of direction of drive means 12 and actuation of rotary solenoid 439 will continue until the cam surfaces of all of the program cams 419a-419p are traversed.

In view of the above discussion it will be apparent that there has been provided an automatic program generator and signaller system having heretofore unknown flexibility. It will be apparent that numerous specific embodiments are provided which allow for an extended and continuous program. It will be also be apparent that such continuous program is provided entirely automatically. It will be further apparent that such system allows for the generation of plural analogue signals based upon a single program.

Although preferred embodiments of the invention have been described in detail, such description is intended to be illustrative only, and not restrictive, since many additional details of the construction of the invention may be altered or modified without departing from the spirit or scope thereof.

What is claimed is:

1. An automatic program generator and signaller system comprising a program cam assembly mounted on a base and including at least one longitudinal program cam having a program surface; a carrier assembly mounted above said program cam assembly for horizontal movement along the longitudinal direction thereof; means for moving said carrier assembly horizontally along said longitudinal direction; a cam follower assembly mounted on said carrier assembly for horizontal movement therewith, said cam follower assembly including a cam follower for traversing said program surface, said cam follower assembly being mounted to move vertically with respect to said carrier assembly in response to the traversal of said cam follower over said program surface; a signal lever one end of which is mounted to be pivoted around a horizontal axis by said cam follower assembly in response to said vertical movement thereof; a first signal takeout attached to said cam follower assembly and adapted to be operatively connected to a first signal device for the generation of a first signal; and a second signal takeout attached to the end of said signal lever opposite said pivoted end and adapted to be overatively connected to a second signal device for the generation of a second signal.

2. A system as claimed in claim 1, further comprising a rack mounted above said program cam assembly, said carrier assembly being mounted for movement along said rack and including a shaft and a gear rigidly mounted on said shaft to mesh with said rack.

3. A system as claimed in claim 2, said means for moving said carrier assembly comprising reversible direction drive means for driving a drive gear, gear means rigidly mounted on said shaft of said carrier assembly, and a drive belt operatively connecting said drive gear and said gear means, whereby operation of said drive means causes said carrier assembly to move horizontally along said rack, thereby allowing said cam follower to traverse said program surface.

4. A system as claimed in claim 1 further comprising a first position detection means mounted adjacent a first end of said program cam assembly and adapted to be actuated by the presence of said cam follower assembly for reversing the direction of said means for moving said carrier assembly, and a second position detection means mounted adjacent a second end of said program cam assembly and adapted to be actuated by the presence of said cam follower assembly for reversing the direction of said means for moving said carrier assembly.

5. A system as claimed in claim 4, wherein said program cam assembly comprises a mounting means positioned for rotation about a horizontal axis above said base, a plurality of program cams attached to said mounting means and extending radially therefrom, and means operable by said first and second position detecting means for rotating said mounting means to selectively index one of said plurality of program cams into a position such that the program surface thereof may be traversed by said cam follower.

6. A system as claimed in claim 5, wherein said plurality of program cams comprise two program cams, each of which has a finishing end and a beginning end, and further comprising bridge means extending from the finishing end of a first of said program cams to the beginning end of a second of said program cams for providing continuing support for said cam follower during said indexing of said program cams.

7. A system as claimed in claim 5, wherein said plurality of program cams are equally radially spaced around said mounting means, each of said program cams having a finishing end and a beginning end, and further comprising bridge means extending from the finishing end of each program cam to the beginning end of the succeeding program cam for providing continuing support for said cam follower during said indexing of said program cams, the radial height of the finishing end of each program cam being equal to the radial height of the beginning end of the succeeding program cam.

8. A system as claimed in claim 4, wherein said program cam assembly comprises a mounting means positioned for rotation about a vertical axis above said base, a plurality of program cams positioned on said mounting means with the longitudinal dimensions thereof extending radially from said axis, and means operable by said first and second position detecting means for rotating said mounting means to selectively index one of said plurality of program cams into a position such that the program surface thereof may be traversed by said cam follower.

9. A system as claimed in claim 8, wherein each of said program cams have a finishing end and a beginning end, the finishing end of each program cam being of the same height as the beginning end of the succeeding program cam, and further comprising bridge means extending from said finishing end of each program cam to said beginning end of said succeeding program cam for providing a continuing support for said cam follower during said indexing of said program cams.

10. A system as claimed in claim 4, wherein said program cam assembly comprises a mounting means positioned for longitudinal movement along said base transverse to the direction of movement of said carrier assembly, a plurality of program cams parallelly mounted on said mounting means, and means operable by said first and second position detecting means for moving said mounting means along said base to selectively index one of said plurality of program cams into a position such that the program surface thereof may be traversed by said cam follower.

11. A system as claimed in claim 10, wherein each of said program cams has a finishing end and a beginning end, the finishing end of each program cam being of the same height as the beginning end of the succeeding program cam, and further comprising bridge means extending from said finishing end of each program cam to said beginning end of said succeeding program cam for providing continuing support for said cam follower during said indexing of said program cams.

* * * * *